(12) United States Patent
Reunanen et al.

(10) Patent No.: US 9,176,023 B2
(45) Date of Patent: Nov. 3, 2015

(54) TURBOMACHINE

(75) Inventors: Arttu Reunanen, Espoo (FI); Erkki Lantto, Helsinki (FI); Ville Tommila, Helsinki (FI)

(73) Assignee: SULZER PUMP SOLUTIONS AB, Malmö (SE)

( * ) Notice: Subject to any disclaimer, the term of this patent is extended or adjusted under 35 U.S.C. 154(b) by 527 days.

(21) Appl. No.: 13/704,594

(22) PCT Filed: Jun. 16, 2011

(86) PCT No.: PCT/FI2011/050573
§ 371 (c)(1),
(2), (4) Date: Mar. 21, 2013

(87) PCT Pub. No.: WO2011/157899
PCT Pub. Date: Dec. 22, 2011

(65) Prior Publication Data
US 2013/0209218 A1 Aug. 15, 2013

(30) Foreign Application Priority Data
Jun. 16, 2010 (SE) ........................................ 1000650

(51) Int. Cl.
*F01B 25/00* (2006.01)
*G01M 15/14* (2006.01)
*F04D 27/00* (2006.01)

(52) U.S. Cl.
CPC .............. *G01M 15/14* (2013.01); *F04D 27/001* (2013.01)

(58) Field of Classification Search
CPC ............................. F04D 27/001; G01M 15/14
USPC ................................................. 415/1, 13, 118
See application file for complete search history.

(56) References Cited

U.S. PATENT DOCUMENTS

| 5,508,943 | A | 4/1996 | Batson et al. |
| 6,186,744 | B1 | 2/2001 | Wolochuk |
| RE38,406 | E | 1/2004 | Faris et al. |
| 8,939,704 | B2 * | 1/2015 | Winkes .............................. 415/1 |
| 2002/0096219 | A1 | 7/2002 | Frasure et al. |
| 2003/0223877 | A1 | 12/2003 | Anstine et al. |
| 2007/0154320 | A1 | 7/2007 | Stiles, Jr. et al. |

FOREIGN PATENT DOCUMENTS

| EP | 0 681 150 A2 | 11/1995 |
| EP | 0 945 623 A2 | 9/1999 |

OTHER PUBLICATIONS

International Search Report mailed on Nov. 29, 2011 for PCT Patent Application No. PCT/FI2011/050573, 5 pages.

* cited by examiner

*Primary Examiner* — Ching Chang
(74) *Attorney, Agent, or Firm* — Kilpatrick Townsend & Stockton LLP (57) ABSTRACT

A method for obtaining an estimate for a process quantity of a turbomachine comprises measuring (301) first process quantities and calculating (302) an estimate for a second process quantity, for example mass flow, on the basis of the measured first process quantities and a reference table of interrelations between process quantities prevailing in reference inlet conditions corresponding to a pre-defined inlet fluid temperature, a pre-defined inlet fluid pressure, and pre-defined fluid properties at the inlet. The reference table and the measured first process quantities represent such a set of data values that the estimate is obtainable on the basis of different sub-sets of the data values. Hence, the estimation task is over-posed in the sense that there is more data than necessary for obtaining the estimate. In the calculation of the estimate, more weight is given to such a part of the data which has a smaller error contribution.

27 Claims, 3 Drawing Sheets

# TURBOMACHINE

This application is a U.S. National Phase under 35 USC 371 of PCT Application No. PCT/FI2011/050573 filed Jun. 16, 2011, which claims priority to the Swedish Application No. 1000650-0, filed Jun. 16, 2010, the disclosures of which are incorporated by reference herein.

FIELD OF THE INVENTION

The invention relates to a method for obtaining an estimate for a process quantity related to a turbomachine. The process quantity can be, for example but not necessarily, mass flow generated by the turbomachine. Furthermore, the invention relates to a turbomachine, a turbomachine system comprising two or more turbomachines, and a computer program for obtaining an estimate for a process quantity related to a turbomachine.

BACKGROUND

In many applications there is a need to estimate or measure one or more process quantities which characterize the operation of a turbomachine which can be e.g. a turboblower, a turbocompressor or a pump. Estimates of the process quantities may be needed, for example, for controlling a turboblower, a turbocompressor or a pump so that unstable or oscillatory flow conditions, known as surge and stall, can be avoided with a sufficient safety margin and/or the efficiency can be kept on an acceptable range. For example, in conjunction with a turbocompressor, the operation can be characterized with the following process quantities: the mass flow (kg/s) or the volumetric flow rate (m³/s) generated by the turbocompressor, torque (Nm) directed to the impeller of the turbocompressor, rotational speed (1/s) of the impeller, pressure rise (Pa) generated by the turbocompressor, temperature (K) at the inlet, i.e. at the suction side, of the turbocompressor, temperature (K) at the outlet, i.e. at the output side, of the turbocompressor, and parameters related to properties of the gas being compressed such as the gas constant.

Some process quantities can be measured with practically sufficient accuracy using relatively cost efficient measurement equipment. However, measuring some other process quantities may require complex and rather expensive equipment and/or some process quantities may be even unmeasurable. Measuring, for example, the mass flow or the volumetric flow rate with a sufficient accuracy may be a challenging task. Due to the above-mentioned reasons, there has been a tendency to develop methods in which part of the process quantities are measured and one or more of the remaining process quantities or other characteristic values are calculated on the basis of the measured values and possibly also on the basis of pre-tabulated data.

Publication U.S. Pat. No. 5,508,943 discloses a method for calculating the proximity of the operating point of a turbocompressor to a surge limit using measurements carried out in different places of the compressor-process system. In the disclosed method, it is crucial that the calculation is invariant to suction conditions, especially gas composition. The various assumptions used in the method may in certain situations compromise the accuracy depending on the validity of the assumptions in each case.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the first aspect of the invention there is provided a new method for obtaining an estimate for a process quantity related to a turbomachine that comprises a chamber having an inlet and an outlet for fluid to be moved and an impeller placed in the chamber for moving the fluid. The turbomachine can be e.g. a turboblower, a turbocompressor or a pump. The method comprises:

measuring first process quantities related to the turbomachine, and calculating an estimate for a second process quantity related to the turbomachine on the basis of measured values of the first process quantities and on the basis of a reference table of interrelations between process quantities prevailing in reference inlet conditions which correspond to a pre-defined inlet fluid temperature, a pre-defined inlet fluid pressure, and pre-defined fluid properties at the inlet.

The reference table and the measured values of the first process quantities represent such a set of data values that the estimate is obtainable on the basis of different sub-sets of the set of data values. In the calculation of the estimate, more weight is given to such a sub-set of the set of data values which has a smaller error estimate than to another sub-set of the set of data values which has a greater error estimate. The error estimate related to each sub-set is proportional to a scalar product of a vector of squares of sensitivities of the estimate with respect to the data values of that sub-set and a vector of variances of the data values of that sub-set. In this document, the meaning of the word "proportional" is not limited to mean only the direct proportionality, i.e. constant quotient, but it means proportionality according to any ascending function, e.g. the square of a positive argument.

As the estimate is obtainable on the basis of different sub-sets of the set of data values, those measured values and/or values tabulated in the reference table which, in each case, have greater variances and/or respect to which the sensitivity of the estimate is higher can be used with a smaller weight or even neglected in the calculation of the estimate. Therefore, the estimation task is over-posed in the sense that there is more data than necessary for obtaining the estimate, and the possibilities provided by this over-posing are utilized for minimizing the error of the estimate.

The calculation of the estimate can be carried out using known mathematical methods. An exemplifying, straightforward calculation method is such that several pre-estimates are first calculated using different sub-sets of the data values which are represented by the measured values and the values tabulated in the reference table. In the next step, each of these pre-estimates is re-calculated one or more times so that, in each re-calculation of a certain pre-estimate, a change is arranged to one of the data values. A ratio of a change of a pre-estimate to a respective change of a data value represents the sensitivity of this pre-estimate with respect to this data value. The error estimate of each pre-estimate can be calculated as the scalar product of the vector of squares of the sensitivities of that pre-estimate and the vector of the variances of data values used for calculating that pre-estimate. The final estimate is the particular one of the pre-estimates which has the smallest error estimate. The above-described method for calculating the estimate adapts itself to prevailing situation in a case-specific manner.

Another exemplifying method for calculating the estimate is to construct a Kalman filter for the over-posed estimation task, define a starting point for the Kalman filter, and to carry out the first step of the Kalman filter for obtaining the estimate.

In accordance with the second aspect of the invention there is provided a new turbomachine that can be e.g. a turboblower, a turbocompressor or a pump. The turbomachine comprises:
- a chamber having an inlet and an outlet for fluid to be moved,
- an impeller placed in the chamber for moving the fluid,
- equipment for measuring first process quantities related to the turbomachine, and
- a processor for calculating an estimate for a second process quantity related to the turbomachine on the basis of measured values of the first process quantities and a reference table of interrelations between process quantities prevailing in reference inlet conditions which correspond to a pre-defined inlet fluid temperature, a pre-defined inlet fluid pressure, and pre-defined fluid properties at the inlet.

The reference table and the measured values of the first process quantities represent such a set of data values that the estimate is obtainable on the basis of different sub-sets of the set of data values, and the processor is arranged to give, in the calculation of the estimate, more weight to a first sub-set of the set of data values which has a smaller error estimate than to a second sub-set of the set of data values which has a greater error estimate. The error estimate related to each sub-set is proportional to a scalar product of a vector of squares of sensitivities of the estimate with respect to the data values of that sub-set and a vector of variances of the data values of that sub-set.

In accordance with the third aspect of the invention there is provided a new turbomachine system comprising an inlet and an outlet for fluid to be moved and at least two turbomachines each of which comprises:
- a chamber connected between the inlet and the outlet,
- an impeller placed in the chamber for moving the fluid, and
- equipment for measuring first process quantities related to that turbomachine.

The turbomachine system further comprises a processor arranged to calculate, for each of the turbomachines, an estimate for a second process quantity related to that turbomachine on the basis of measured values of the first process quantities and a reference table of interrelations between process quantities prevailing in reference inlet conditions which correspond to a pre-defined inlet fluid temperature, a pre-defined inlet fluid pressure, and pre-defined fluid properties at the inlet. The reference table and the measured values of the first process quantities represent such a set of data values that the estimate is obtainable on the basis of different sub-sets of the set of data values, and the processor is arranged to give, in the calculation of the estimate, more weight to a first sub-set of the set of data values which has a smaller error estimate than to a second sub-set of the set of data values which has a bigger error estimate. The processor is further arranged to start and stop one or more of the turbomachines so as to keep the estimates related to running turbo machines on a desired range.

For example, the estimates can be estimates of mass flows of the turbomachines, and one or more of the turbomachines are stopped if the total mass flow, i.e. the sum of the mass flows of the turbomachines, drops down so that it would be no more possible to run all the running turbomachines at a preferred operating area, e.g. an operating area corresponding to a sufficient efficiency. Correspondingly, one or more of the turbomachines can be started if the total mass flow increases so that it would not be possible to run only the already running turbomachines at the preferred operating area. For another example, it is possible that the estimates are estimates of the isentropic efficiency of the turbomachines, and the processor is arranged to control the rotational speeds of the turbomachines and/or the number of running turbomachines so as to minimize the sum of losses of the turbomachines, i.e. to maximize the total efficiency.

In accordance with the fourth aspect of the invention there is provided a new computer program for obtaining an estimate for a process quantity related to a turbomachine that comprises a chamber having an inlet and an outlet for fluid to be moved, an impeller placed in the chamber for moving the fluid, and equipment for measuring first process quantities related to the turbomachine. The computer program comprises computer executable instructions for controlling a programmable processor to calculate an estimate for a second process quantity related to the turbomachine on the basis of measured values of the first process quantities and a reference table of interrelations between process quantities prevailing in reference inlet conditions which correspond to a pre-defined inlet fluid temperature, a pre-defined inlet fluid pressure, and pre-defined fluid properties at the inlet. The reference table and the measured values of the first process quantities represent such a set of data values that the estimate is obtainable on the basis of different sub-sets of the set of data values, and the computer program comprises computer executable instructions for controlling the programmable processor to give, in the calculation of the estimate, more weight to a first sub-set of the set of data values which has a smaller error estimate than to a second sub-set of the set of data values which has a greater error estimate, where the error estimate related to each sub-set is proportional to a scalar product of a vector of squares of sensitivities of the estimate with respect to the data values of that sub-set and a vector of variances of the data values of that sub-set.

In accordance with the fifth aspect of the invention there is provided a new computer program product. The computer program product comprises a computer readable medium, e.g. a compact disc ("CD"), encoded with a computer program according to the invention.

A number of exemplifying embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verb "to comprise" is used in this document as an open limitation that neither excludes nor requires the existence of also un-recited features. The features recited in depending claims are mutually freely combinable unless otherwise explicitly stated.

BRIEF DESCRIPTION OF THE FIGURES

The exemplifying embodiments of the invention and their advantages are explained in greater detail below with reference to the accompanying drawings, in which.

DESCRIPTION OF THE EXEMPLIFYING EMBODIMENTS

Figure 1:
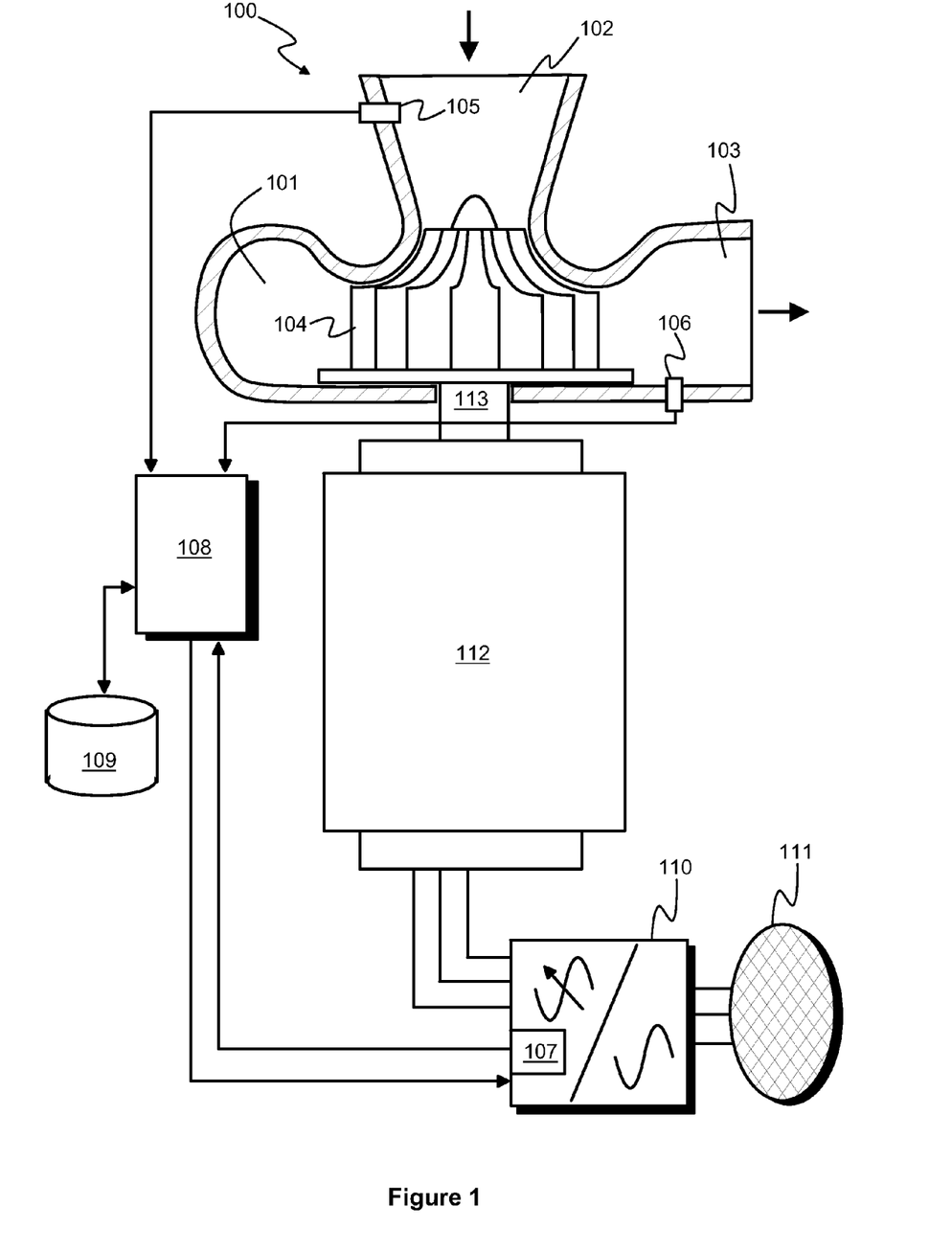
FIG. 1 shows a schematic illustration of a turbomachine according to an embodiment of the invention.

FIG. 1 shows a schematic illustration of a turbomachine 100 according to an exemplifying embodiment of the invention. The turbomachine comprises a chamber 101 that has an inlet 102 and an outlet 103 for fluid to be moved. In FIG. 1, the chamber 101 is shown as a section view. The turbomachine comprises an impeller 104 placed in the chamber for moving the fluid. The impeller is driven with an electrical motor 112 fed with a static frequency converter 110 that is connected to an electric power network 111. The electrical motor can be, for example, an induction motor, a permanent magnet synchronous motor, a brushless dc-motor, or a reluctance motor. It is also possible that the impeller is driven with a combustion engine. In the exemplifying turbomachine illustrated in FIG. 1, the impeller is directly connected to the shaft 113 of the electrical motor. However, it is also possible to have a gear between the impeller and the motor driving the impeller. The electrical motor can be a high speed induction motor having a solid rotor. In this document, the term "high speed" means that the rotational speed of the motor is more than 5000 rpm. The turbomachine comprises equipment for measuring first process quantities related to the turbomachine. The equipment comprises a first sensor 105 for measuring the inlet temperature and the inlet pressure, and a second sensor 106 for measuring the outlet pressure and possibly also the outlet temperature. The equipment further comprises those parts 107 of the static frequency converter 110 which are arranged to produce estimates for the rotational speed of the impeller and for the torque directed to the impeller. Therefore, in this case the first process quantities which are measured are:

the torque M directed to the impeller,
the rotational speed $\Omega$ of the impeller,
the pressure $p_{in}$ at the inlet,
the pressure $p_{out}$ at the outlet, and
the temperature $T_{in}$ at the inlet.

The torque M and the rotational speed $\Omega$ are typically, but not necessarily, measured in an indirect manner so that electrical power to the electrical motor 112 is measured first and then an estimate for the mechanical power directed to the impeller 104 is obtained by subtracting estimated losses of the electrical motor from the measured electrical power. An estimate for the rotational speed $\Omega$ is obtained on the basis of the frequency of the voltage supplied to the electrical motor, and an estimate for the torque M is obtained as a ratio of the mechanical power to the rotational speed.

The turbomachine comprises a processor 108 for calculating an estimate for a second process quantity related to the turbomachine on the basis of measured values of the above-mentioned first process quantities and a reference table of interrelations between process quantities prevailing in reference inlet conditions which correspond to a pre-defined inlet temperature, a pre-defined inlet pressure, and pre-defined fluid properties at the inlet. The processor 108 can be a single processor unit or a combination of several interconnected processor units. Furthermore, the processor can comprise one or more programmable circuits and/or one or more application specific circuits. The reference table is stored in a memory 109 that can be an integrated part of the turbomachine or an external device that is connectable to the processor 108.

The reference table and the measured values of the first process quantities represent such a set of data values that the estimate for the second process quantity is obtainable on the basis of different sub-sets of the set of data values. As the estimate is obtainable on the basis of different sub-sets of the set of data values, those measured values or values tabulated in the reference table which, in each case, have greater variances and/or respect to which the sensitivity of the estimate is higher can be used with a smaller weight or even neglected in the calculation of the estimate. Therefore, the estimation task is over-posed in the sense that there is more data than necessary for obtaining the estimate, and the possibilities provided by this over-posing are utilized for minimizing the error of the estimate.

The calculation of the estimate can be carried out using known mathematical methods. A couple of examples are described below.

In a turbomachine according to an embodiment of the invention, the processor 108 is arranged to calculate several pre-estimates $E_1, E_2, \ldots, E_n$ for the second process quantity on the basis of different sub-sets of the data values which are represented by the measured values of the first process quantities and the values tabulated in the reference table. The processor 108 is further arranged to re-calculate each of the pre-estimates one or more times so that, in each re-calculation of a certain pre-estimate, a change is arranged to one of the data values used for the pre-estimate under consideration. The processor 108 is further arranged to calculate ratios of changes of the pre-estimates to relevant changes of the data values $\Delta E_1/\Delta v_1, \Delta E_1/\Delta v_2, \ldots, \Delta E_2/\Delta v_1, \Delta E_2/\Delta v_2, \ldots$ etc. These quotients represent the sensitivities of the pre-estimates with respect to the data values. The processor 108 is further arranged to calculate an error estimate for each pre-estimate so that the error estimate is $(\Delta E_i/\Delta v_1)^2 \times \sigma_1^2 + (\Delta E_i/\Delta v_2)^2 \times \sigma_2^2 + \ldots + (\Delta E_i/\Delta v_m)^2 \times \sigma_m^2$, where i=1, 2, ... or n and $\sigma_1^2, \sigma_2^2, \sigma_m^2$ are the variances of the data values $v_1, v_2, \ldots v_m$ used for the pre-estimate $E_i$. Hence, the error estimate is the scalar product of the vector of squares of the sensitivities $((\Delta E_i/\Delta v_1)^2, (\Delta E_i/\Delta v_2)^2, \ldots, (\Delta E_i/\Delta v_m)^2)$ and the vector of the variances $(\sigma_1^2, \sigma_2^2, \sigma_m^2)$. The processor 108 is further arranged to select the final estimate E for the second process quantity to be the particular one of the pre-estimates $E_1, E_2, \ldots, E_n$ which has the smallest error estimate.

In a turbomachine according to an embodiment of the invention, the processor 108 is arranged to construct a Kalman filter for the over-posed estimation task, define a starting point for the Kalman filter, and to carry out the first step of the Kalman filter for obtaining the estimate. More detailed information about the Kalman filter can be found from e.g. R. E. Kalman, 1960. "*A new approach to linear filtering and prediction problems*", *Transactions of the ASME—Journal of Basic Engineering* 82, Series D: 35-45.

A turbomachine according to an embodiment of the invention is a turbocompressor for moving gas. In this case, the pre-defined fluid properties at the inlet can be defined to correspond to a pre-defined value of the gas-constant.

A turbomachine according to an embodiment of the invention is a pump for moving liquid. In this case, the pre-defined fluid properties at the inlet can be defined to correspond to a pre-defined density of the liquid.

In the following, the operational principles related to an example case in which the turbomachine is a turbocompressor and the processor 108 is arranged to calculate an estimate for the mass flow $q_m$ (kg/s) generated by the turbocompressor, are described with more details. Hence, in this example case the second process quantity to be estimated is the mass flow.

In order to describe the operational principles, we assume that the reference table contains tabulated values of the isentropic efficiency $\eta_{is}$ and tabulated values of the rotational speed $\Omega$ (1/s) in the reference inlet conditions as functions of the mass flow $q_m$ and the pressure ratio $\pi$ in the reference inlet conditions. Hence, the reference table can be presented in the form:

$\eta_{is0} = \eta_{is0}(q_{m0}, \pi_0),$ $\Omega_0 = \Omega_0(q_{m0}, \pi_0),$ where the subscript '0' refers to the reference inlet conditions and the pressure ratio $\pi$ is $p_{out}/p_{in}$.

Exemplifying ways to calculate the estimate for the mass flow $q_m$ are presented below for the sake of illustrative purposes. In these examples, the set of data values represented by the reference table and the measured values of the first process quantities contains the following data values:

the measured torque M directed to the impeller, the measured rotational speed $\Omega$ of the impeller, the measured pressure $p_{in}$ at the inlet, the measured pressure rise $\Delta p = p_{out} - p_{in}$, the measured temperature $T_{in}$ at the inlet, the tabulated isentropic efficiency in the reference inlet conditions $\eta_{is0} = \eta_{is0}(q_{m0}, \pi_0)$, and the tabulated rotational speed in the reference inlet conditions $\Omega_0 = \Omega_0(q_{m0}, \pi_0)$.

It is assumed that the reference inlet conditions and the actual operating conditions are kinematically similar to each other, i.e. the directions of the velocity vectors are the same and the Mach's numbers are the same. The rotational speeds, the mass flows, the pressure ratios, and the torques in the actual operating conditions and in the reference inlet conditions are assumed to be related as:

$$\Omega = \Omega_0(q_{m0}, \pi_0) k_{STR}, \quad (1a)$$

$$q_m = q_{m0} \frac{k_p}{k_{STR}}, \quad (1b)$$

$$\pi = \pi_0, \quad (1c)$$

$$k_{STR} = \sqrt{\frac{T_{in} R}{T_{in0} R_0}}, \quad (1d)$$

$$k_p = \frac{p_{in}}{p_{in0}}, \quad (1e)$$

$$M = k_p \frac{R_0 c_p (\pi^{R/c_p} - 1)}{R c_{p0} (\pi^{R_0/c_{p0}} - 1)} M_0, \quad (1f)$$

where R is the gas constant and $c_p$ is the specific heat capacity at constant pressure. In this document, the coefficients $k_{STR}$ and $k_p$ are called temperature factor and pressure factor, respectively. As can be seen, the pressure ratio $\pi$ is assumed to be the same in the actual conditions and in the reference inlet conditions. Therefore, in the following, the subscript zero is dropped out from the pressure ratio $\pi$. The grounds for equations (1a-1f) can be found from basic handbooks of the field of turbomachinery.

In the reference inlet conditions, the torque $M_0$ can be expressed as:

$$M_0 = \frac{T_{in0} c_{p0} (\pi^{R_0/c_{p0}} - 1) q_{m0}}{\Omega_0(q_{m0}, \pi) \eta_{is0}(q_{m0}, \pi)}. \quad (2)$$

Substituting equation (2) to equation (1f) gives the torque in the actual operating conditions:

$$M = k_p \frac{R_0 c_p T_{in0} (\pi^{R/c_p} - 1) q_{m0}}{R \Omega_0(q_{m0}, \pi) \eta_{is0}(q_{m0}, \pi)}. \quad (3)$$

Equation (1a) gives the rotational speed in the actual operating conditions, i.e.

$\Omega = \Omega_0(q_{m0}, \pi) k_{STR}.$

The inlet pressure in the actual operating conditions is given by equation (1e), i.e.

$p_{in} = p_{in0} k_p.$

The pressure rise in the actual operating conditions can be derived from equations (1c) and (1e), i.e.

$\Delta p = p_{out} - p_{in} = (\pi - 1) p_{in} = (\pi - 1) p_{in0} k_p.$

The inlet temperature in the actual operating conditions can be solved from equation (1d), i.e.

$T_{in} = R_0 T_{in0} k^2_{STR}/R.$

The mass flow $q_m$ in the actual operating conditions can be solved using any of the following sub-sets A-D of the set of data values represented by the reference table and the measured values of the first process quantities:

Sub-set A: M, $\Omega$, $p_{in}$, $\Delta p$, $\eta_{is0}(q_{m0}, \pi)$, $\Omega_0(q_{m0}, \pi)$, Sub-set B: M, $T_{in}$, $p_{in}$, $\Delta p$, $\eta_{is0}(q_{m0}, \pi)$, $\Omega_0$(qmo, 7), Sub-set C: M, $\Omega$, $p_{in}$, $\Delta p$, $T_{in}$, $\eta_{is0}(q_{m0}, \pi)$, Sub-set D: $\Omega$, $p_{in}$, $\Delta p$, $T_{in}$, $\Omega_0(q_{m0}, \pi)$, In conjunction with all of these sub-sets A-D, the estimates for the pressure factor and for the pressure ratio can be obtained as $k_p = p_{in}/p_{in0}$ and $\pi = (p_{in} + \Delta p)/p_{in}$.

Concerning the sub-set A, the mass flow $q_{m0}$ in the reference inlet conditions can be solved from equation (3) with the assumption that $R = R_0$ or with some other knowledge about the gas constant R. The temperature factor $k_{STR}$ can be solved from equation (1a) as $k_{STR} = \Omega/\Omega_0(q_{m0}, \pi)$. An estimate $E_A$ for the mass flow $q_m$ in the actual operating conditions can be calculated with equation (1b).

Concerning the sub-set B, the mass flow $q_{m0}$ in the reference inlet conditions can be solved from equation (3) with the assumption that $R = R_0$ or with some other knowledge about the gas constant R. The temperature factor $k_{STR}$ can be calculated from equation (1d) with the assumption that $R = R_0$ or with some other knowledge about the gas constant R. An estimate $E_B$ for the mass flow $q_m$ in the actual operating conditions can be calculated with equation (1b).

Concerning the sub-set C, the mass flow $q_{m0}$ in the reference inlet conditions can be solved from the following equation that is constructed by multiplying equations (1a) and (3) with each other $$M\Omega = k_p k_{STR} \frac{R_0 c_p T_{in0} (\pi^{R/c_p} - 1) q_{m0}}{R \eta_{is0}(q_{m0}, \pi)},$$

where an assumption that $R=R_0$ or some other knowledge about the gas constant R can be used. The temperature factor $k_{STR}$ can be calculated from equation (1d) with the assumption that $R=R_0$ or with some other knowledge about the gas constant R. An estimate $E_C$ for the mass flow $q_m$ in the actual operating conditions can be calculated with equation (1b).

Concerning the sub-set D, the temperature factor $k_{STR}$ can be calculated from equation (1d) with the assumption that $R=R_0$ or with some other knowledge about the gas constant R. Using the calculated $k_{STR}$, the mass flow $q_{m0}$ in the reference inlet conditions can be solved from equation (1a). An estimate $E_D$ for the mass flow $q_m$ in the actual operating conditions can be calculated with equation (1b).

It should be noted that the reference table does not necessarily have to contain the values of the isentropic efficiency $\eta_{iso}$ and the values of the rotational speed $\Omega_0$ in the reference inlet conditions as functions of the mass flow $q_{m0}$ and the pressure ratio $\pi$ in the reference inlet conditions. For example, it is also possible that the reference table contains the values of the mass flow $q_{m0}$ and the values of the rotational speed $\Omega_0$ in the reference inlet conditions as functions of the torque $M_0$ and the pressure ratio $\pi$ in the reference inlet conditions:

$$q_{m0}=q_{m0}(M_0,\pi),$$

$$\Omega_0=\Omega'_0(M_0,\pi).$$

As in the earlier-presented case in which the reference table $\{\eta_{iso}(q_{m0}, \pi_0), \Omega_0(q_{m0}, \pi_0)\}$ was used, similar mathematical considerations for solving the estimates of the mass flow in conjunction with different sub-sets of the data values can be presented also when the reference table $\{q_{m0}(M_0, \pi), \Omega'_0(M_0, \pi)\}$ is used. For example, concerning the sub-set A, the temperature factor $k_{STR}$ can be solved from equation (1a) as $k_{STR}=\Omega/\Omega'_0(M_0, \pi)$ and the estimate $E_A$ for the mass flow $q_m$ in the actual operating conditions can be calculated from equation (1b) as $k_p q_{m0}(M_0, \pi)/k_{STR}$, where $M_0$ can be solved from equation (1f) with the assumptions that $R=R_0$ and $c_p=c_{p0}$ or with some other knowledge about the gas constant R and/or the specific heat capacity $c_p$.

Each of the above-mentioned estimates $E_A$, $E_B$, $E_C$, and $E_D$ can be re-calculated one or more times so that, in each re-calculation, a change is arranged to one of the data values used for the estimate $E_A$, $E_B$, $E_C$, or $E_D$ under consideration. For example, a changed data value $\Omega+\Delta\Omega$ is used in one of the re-calculations of the estimate $E_A$. The change of the estimate $\Delta E_A$ is the estimate $E_A$ calculated with the changed data value $\Omega+\Delta\Omega$ minus the estimate $E_A$ calculated with the original data value $\Omega$. A ratio of the change of the estimate $E_A$, $E_B$, $E_C$, or $E_D$ to the change of the relevant data value represents the sensitivity of that estimate with respect to this data value. For example, $\Delta E_A/\Delta\Omega$ represents the sensitivity of the estimate $E_A$ with respect to the data value $\Omega$. The error estimate of the estimate $E_A$, $E_B$, $E_C$, or $E_D$ can be calculated as the scalar product of the vector of squares of the sensitivities of that estimate and the vector of the variances of data values used for calculating that estimate. The final estimate E is the particular one of the estimates $E_A$, $E_B$, $E_C$, and $E_D$ which has the smallest error estimate.

In a turbomachine according to an embodiment of the invention, the processor 108 is arranged to use, in the calculation of the estimate, the variances or other error indicators of only the measured values of the first process quantities for obtaining the estimate in which more weight has been given to those data values which correspond to a smaller error contribution than to those data values which correspond to a greater error contribution. In this case, the values tabulated in the reference table are handled as if they were exact and error-free values.

In a turbomachine according to another embodiment of the invention, the processor 108 is arranged to use, in the calculation of the estimate, the variances or other error indicators of both the values tabulated in the reference table and the measured values of the first process quantities. In this case, also the values tabulated in the reference table are handled as values having certain errors.

In a turbomachine according to an embodiment of the invention, the processor 108 is arranged to control the rotational speed of the impeller on the basis of the estimate of the second process quantity, e.g. the mass flow. It is also possible that the processor is arranged to calculate an estimate for the isentropic efficiency in the actual operating conditions and control the rotational speed of the impeller so as to optimize the isentropic efficiency in the actual operating conditions.

In a turbomachine according to an embodiment of the invention, the processor 108 is arranged to produce start and stop commands for one or more other parallel operating turbomachines so as to keep the estimate on a desired range. The desired range can correspond to, for example, such operating points of the turbomachine at which the isentropic or total efficiency of the turbomachine is above a pre-defined limit value.

In a turbomachine according to an embodiment of the invention, the processor 108 is arranged to control one or more inlet guide vanes, one or more outlet guide vanes, and/or one or more diffuser guide vanes on the basis of the estimate of the second process quantity.

Figure 2:
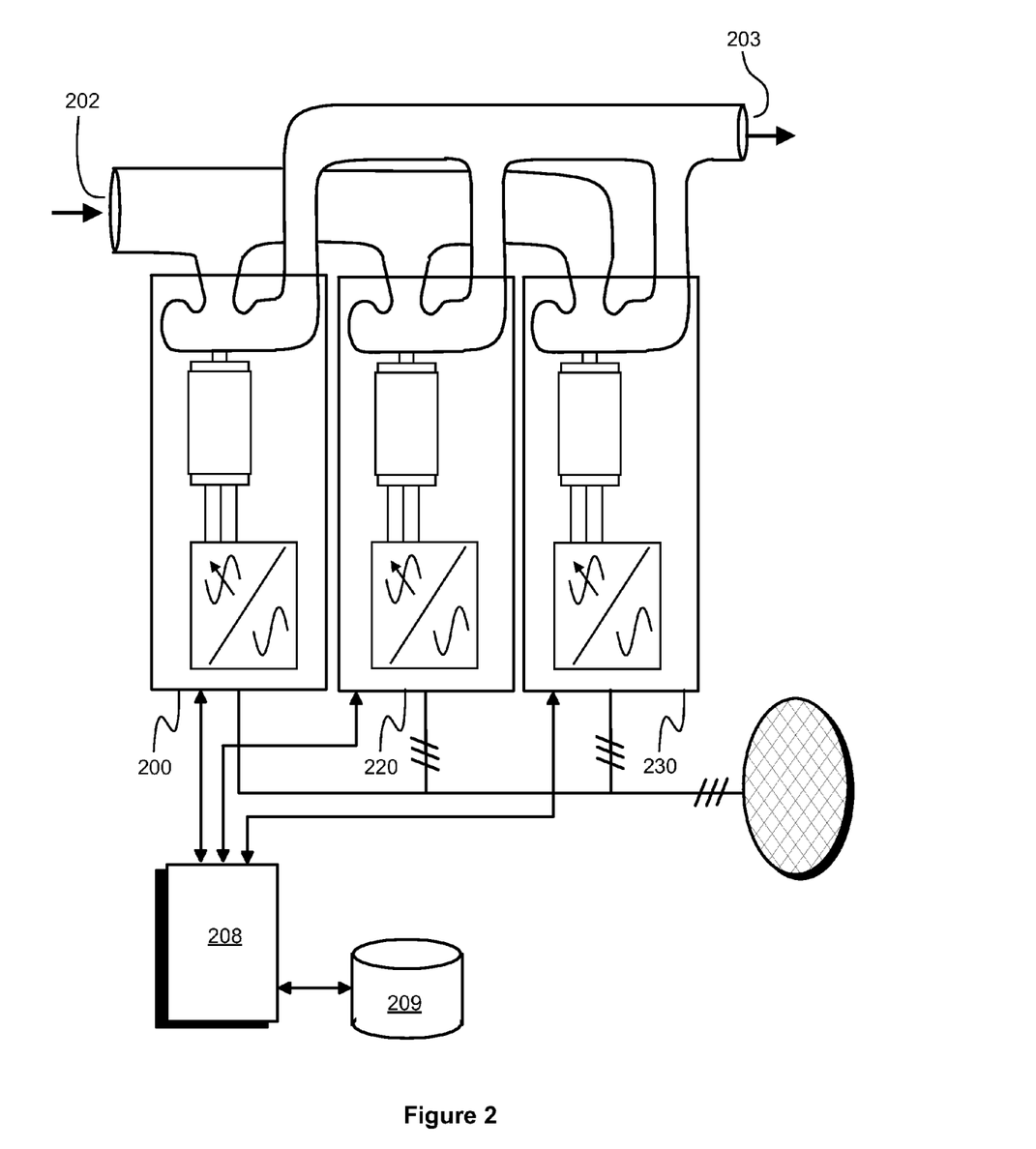
FIG. 2 shows a schematic illustration of a turbomachine system according to an embodiment of the invention.

FIG. 2 shows a schematic illustration of a turbomachine system according to an embodiment of the invention. The turbomachine system comprises an inlet 202 and an outlet 203 for fluid to be moved and turbomachines 200, 220, and 230. The turbomachines 200, 220, and 230 can be turboblowers, turbocompressors or pumps and each of the turbomachines comprises:
a chamber connected between the inlet and the outlet,
an impeller placed in the chamber for moving the fluid, and
equipment for measuring first process quantities related to that turbomachine.

The turbomachine system further comprises a processor 208 arranged to calculate for each of the turbomachines 200, 220, and 230 an estimate for a second process quantity related to that turbomachine on the basis of measured values of the first process quantities and a reference table of interrelations between process quantities prevailing in reference inlet conditions which correspond to a pre-defined inlet fluid temperature, a pre-defined inlet fluid pressure, and pre-defined fluid properties at the inlet. The reference table and the measured values of the first process quantities represent such a set of data values that the estimate is obtainable on the basis of different sub-sets of the set of data values, and the processor is arranged to give, in the calculation of the estimate, more weight to a such sub-set of the set of data values which has a smaller error estimate than to another sub-set of the set of data values which has a bigger error estimate. The error estimate related to each sub-set is proportional to a scalar product of a vector of squares of sensitivities of the estimate with respect to the data values of that sub-set and a vector of variances of the data values of that sub-set.

The processor 208 is further arranged to start and stop one or more of the turbomachines so as to keep the calculated estimates related to running turbo machines on a desired range. For example, the estimates can be estimates of the mass flows of the turbomachines, and one or more of the turbomachines is stopped if the total mass flow, i.e. the sum of the mass flows of the turbomachines, drops down so that it would be no more possible to run all the running turbomachines on a preferred operating area, e.g. an operating area corresponding to a sufficient efficiency. Correspondingly, one or more of the turbomachines can be started if the total mass flow increases so that it would not be possible to run only the already running turbomachines on the preferred operating area. For another example, it is possible that the calculated estimates are estimates of the isentropic efficiency of the turbomachines, and the processor 208 is arranged to control the rotational speeds of the turbomachines and/or the number of running turbomachines so as to minimize the sum of losses of the turbomachines, i.e. to maximize the total efficiency.

The processor 208 can be a single processor unit or a combination of several interconnected processor units. Furthermore, the processor can comprise one or more programmable circuits and/or one or more application specific circuits. For example, in a case in which the impellers of the turbomachines are driven with alternating current motors fed with static frequency converters, the processor 208 may comprise the processors of the frequency converters. In this case, the processing task may be shared so that the processor of each frequency converter is arranged to calculate the estimate related to the turbomachine comprising that frequency converter, and the processor of one of the frequency converters is arranged to operate as a master processor for controlling the whole turbomachine system.

The reference table is stored in a memory 209 that can be an integrated part of the turbomachine system or an external device that is connectable to the processor 208. The reference table may contain separate parts for two or more of the turbomachines 200, 220, and 230 if said two or more turbomachines are mutually so different that the same tabulated values would not be suitable for these turbomachines.

Figure 3:
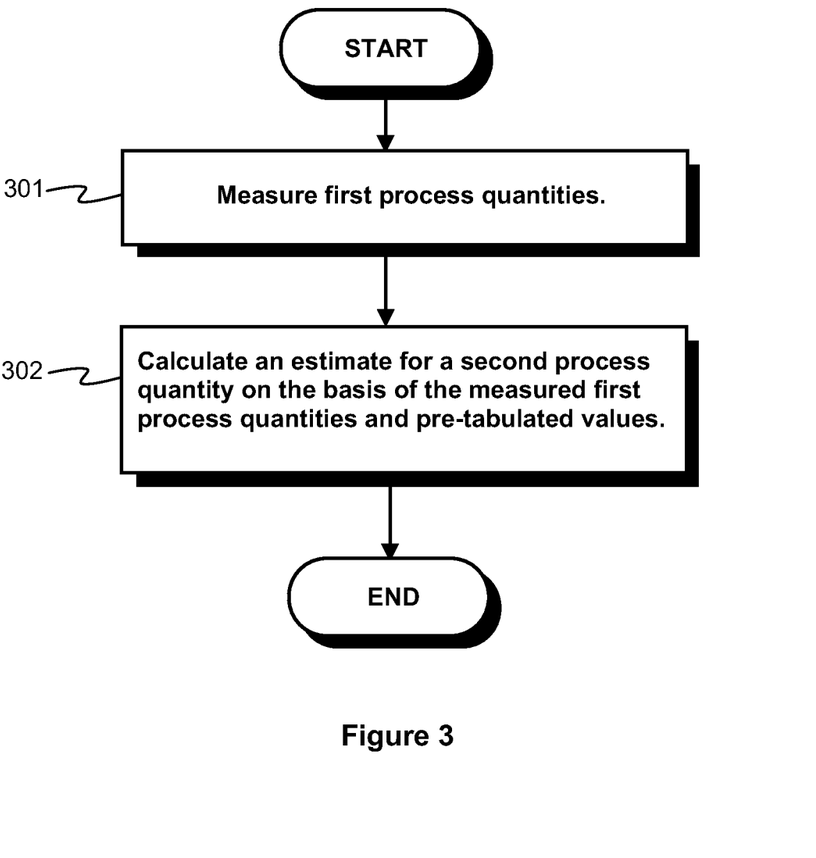
FIG. 3 shows a flow chart of a method according to an embodiment of the invention for obtaining an estimate for a process quantity related to a turbomachine.

FIG. 3 shows a flow chart of a method according to an embodiment of the invention for obtaining an estimate for a process quantity related to a turbomachine that comprises a chamber having an inlet and an outlet for fluid to be moved and an impeller placed in the chamber for moving the fluid. The method comprises:
  measuring, in the phase 301, first process quantities related to the turbomachine, and
  calculating, in the phase 302, an estimate for a second process quantity related to the turbomachine on the basis of measured values of the first process quantities and a reference table of interrelations between process quantities prevailing in reference inlet conditions which correspond to a pre-defined inlet fluid temperature, a pre-defined inlet fluid pressure, and pre-defined fluid properties at the inlet.

The reference table and the measured values of the first process quantities represent such a set of data values that the estimate is obtainable on the basis of different sub-sets of the set of data values, and, in the calculation of the estimate, more weight is given to a first sub-set of the set of data values which has a smaller error estimate than to a second sub-set of the set of data values which has a greater error estimate. The error estimate related to each sub-set is proportional to a scalar product of a vector of squares of sensitivities of the estimate with respect to the data values of that sub-set and a vector of variances of the data values of that sub-set.

In a method according to an embodiment of the invention, the first sub-set is given more weight than the second sub-set by using variances or other error indicators of both the data values represented by values of the reference table and the data values represented by the measured values of the first process quantities.

In a method according to an embodiment of the invention, the estimate is calculated with different values of the data values so as to obtain changes of the estimate corresponding to changes in the data values, a ratio of the change of the estimate to the change of each data value representing the sensitivity of the estimate with respect to that data value.

In a method according to an embodiment of the invention, the turbomachine is a turbo compressor for moving gas, the pre-defined fluid properties at the inlet corresponding to a pre-defined value of the gas-constant.

In a method according to an embodiment of the invention, the first process quantities are: the torque directed to the impeller, the rotational speed of the impeller, the pressure rise of the gas, the inlet pressure of the gas, and the inlet temperature of the gas. The reference table contains tabulated values of the isentropic efficiency and the rotational speed in the reference inlet conditions as functions of the mass flow and the pressure ratio in the reference inlet conditions. The second process quantity to be estimated is the mass flow in the actual operating conditions. In a method according to another embodiment of the invention, the reference table contains tabulated values of the mass flow and the rotational speed in the reference inlet conditions as functions of the torque and the pressure ratio in the reference inlet conditions.

In a method according to an embodiment of the invention, the rotational speed of the impeller is controlled on the basis of the estimate of the second process quantity.

In a method according to an embodiment of the invention, start and stop commands are produced for one or more other turbomachines so as to keep the estimate on a desired range.

In a method according to an embodiment of the invention, the turbomachine is a pump for moving liquid, the pre-defined fluid properties at the inlet corresponding to a pre-defined a density of the liquid.

In a method according to an embodiment of the invention, one or more inlet guide vanes, one or more outlet guide vanes, and/or one or more diffuser guide vanes is/are controlled on the basis of the estimate of the second process quantity.

A computer program according to an embodiment of the invention comprises software modules for obtaining an estimate for a process quantity related to a turbomachine that comprises a chamber having an inlet and an outlet for fluid to be moved, an impeller placed in the chamber for moving the fluid, and equipment for measuring first process quantities related to the turbomachine. The software modules can be, for example, subroutines or functions.

The software modules comprise computer executable instructions for controlling a programmable processor to calculate an estimate for a second process quantity related to the turbomachine on the basis of measured values of the first process quantities and a reference table of interrelations between process quantities prevailing in reference inlet conditions which correspond to a pre-defined inlet fluid temperature, a pre-defined inlet fluid pressure, and pre-defined fluid properties at the inlet. The reference table and the measured values of the first process quantities represent such a set of data values that the estimate is obtainable on the basis of different sub-sets of the set of data values, and the software modules comprises computer executable instructions for controlling the programmable processor to give, in the calculation of the estimate, more weight to a first sub-set of the set of data values which has a smaller error estimate than to a second sub-set of the set of data values which has a greater error estimate, where the error estimate related to each sub-set is proportional to a scalar product of a vector of squares of sensitivities of the estimate with respect to the data values of that sub-set and a vector of variances of the data values of that sub-set.

In a computer program according to an embodiment of the invention, the software modules comprise computer executable instructions for controlling the programmable processor to control the rotational speed of the impeller on the basis of the estimate of the second process quantity.

In a computer program according to an embodiment of the invention, the software modules comprise computer executable instructions for controlling the programmable processor to produce start and stop commands for one or more other turbomachines so as to keep the estimate of the second process quantity on a desired range.

A computer program product according to an embodiment of the invention comprises a computer readable medium, e.g. a compact disc ("CD"), encoded with a computer program according to an embodiment of invention.

A signal according to an embodiment of the invention is encoded to carry information defining a computer program according to an embodiment of invention.

The specific examples provided in the description given above should not be construed as limiting. Therefore, the invention is not limited merely to the embodiments described above, many variants being possible.

What is claimed is:

1. A turbomachine (100) comprising:
   a chamber (101) having an inlet (102) and an outlet (103) for fluid to be moved,
   an impeller (104) placed in the chamber for moving the fluid,
   equipments (105-107) for measuring first process quantities related to the turbomachine, and
   a processor (108) for calculating an estimate for a second process quantity related to the turbomachine on the basis of measured values of the first process quantities and a reference table of interrelations between process quantities prevailing in reference inlet conditions which correspond to a predefined inlet fluid temperature, a predefined inlet fluid pressure, and predefined fluid properties at the inlet,
   characterized in that the reference table and the measured values of the first process quantities represent such a set of data values that the estimate is obtainable on the basis of different sub-sets of the set of data values, and the processor is arranged to give, in the calculation of the estimate, more weight to a first sub-set of the set of data values which has a smaller error estimate than to a second sub-set of the set of data values which has a greater error estimate in order to increase the accuracy of the estimate, the error estimate related to each sub-set being proportional to a scalar product of a vector of squares of sensitivities of the estimate with respect to the data values of that sub-set and a vector of variances of the data values of that sub-set.

2. A turbomachine according to claim 1, wherein the processor is arranged to use, for giving to the first sub-set more weight than to the second sub-set, variances or other error indicators of both the data values represented by values of the reference table and the data values represented by the measured values of the first process quantities.

3. A turbomachine according to claim 1, wherein the processor is arranged to calculate the estimate with different values of the data values so as to obtain changes of the estimate corresponding to changes of the data values, a ratio of the change of the estimate to the change of each data value representing the sensitivity of the estimate with respect to that data value.

4. A turbomachine according to claim 1, wherein the turbomachine is a turbo compressor for moving gas, the pre-defined fluid properties at the inlet corresponding to a pre-defined value of a gas-constant.

5. A turbomachine according to claim 4, wherein the first process quantities are:
   torque directed to the impeller,
   rotational speed of the impeller,
   pressure rise of the gas,
   inlet pressure of the gas, and
   inlet temperature of the gas,
   and wherein the reference table contains tabulated values of isentropic efficiency and tabulated values of rotational speed in the reference inlet conditions as functions of mass flow and pressure ratio in the reference inlet conditions, and wherein the second process quantity is the mass flow in the actual operating conditions.

6. A turbomachine according to claim 4, wherein the first process quantities are:
   torque directed to the impeller,
   rotational speed of the impeller,
   pressure rise of the gas,
   inlet pressure of the gas, and
   inlet temperature of the gas,
   and wherein the reference table contains tabulated values of mass flow and tabulated values of rotational speed in the reference inlet conditions as functions of torque and pressure ratio in the reference inlet conditions, and wherein the second process quantity is the mass flow in the actual operating conditions.

7. A turbomachine according to claim 1, wherein the turbomachine is a pump for moving liquid, the pre-defined fluid properties at the inlet corresponding to a predefined a density of the liquid.

8. A turbomachine according to claim 1, wherein the processor is arranged to control the rotational speed of the impeller on the basis of the estimate of the second process quantity.

9. A turbomachine according to claim 1, wherein the processor is arranged to control at least one from the following list on the basis of the estimate of the second process quantity: one or more inlet guide vanes, one or more outlet guide vanes, one or more diffuser guide vanes.

10. A turbomachine according to claim 1, wherein the turbomachine comprises an electrical motor (1 12) for rotating the impeller and the impeller is directly connected to a shaft (1 13) of the electrical motor.

11. A turbomachine according to claim 10, wherein the turbomachine comprises a static frequency converter (1 10) for supplying electrical power to the electrical motor (1 12).

12. A turbomachine according to claim 1, wherein the processor is arranged to produce start and stop commands for one or more other turbomachines so as to keep the estimate on a desired range.

13. A method for obtaining an estimate for a process quantity related to a turbomachine that comprises a chamber having an inlet and an outlet for fluid to be moved and an impeller placed in the chamber for moving the fluid, the method comprising:
   measuring (301) first process quantities related to the turbomachine, and
   calculating (302) an estimate for a second process quantity related to the turbomachine on the basis of measured values of the first process quantities and a reference table of interrelations between process quantities prevailing in reference inlet conditions which correspond to a pre-defined inlet fluid temperature, a pre-defined inlet fluid pressure, and pre-defined fluid properties at the inlet, characterized in that the reference table and the measured values of the first process quantities represent such a set of data values that the estimate is obtainable on the basis of different sub-sets of the set of data values, and, in the calculation of the estimate, more weight is given to a first sub-set of the set of data values which has a smaller error estimate than to a second sub-set of the set of data values which has a greater error estimate in order to increase the accuracy of the estimate, the error estimate related to each sub-set being proportional to a scalar product of a vector of squares of sensitivities of the estimate with respect to the data values of that sub-set and a vector of variances of the data values of that sub-set.

14. A method according to claim 13, wherein the first sub-set is given more weight than the second sub-set by using variances or other error indicators of both the data values represented by values of the reference table and the data values rep-resented by the measured values of the first process quantities.

15. A method according to claim 13, wherein the estimate is calculated with different values of the data values so as to obtain changes of the estimate corresponding to changes of the data values, a ratio of the change of the estimate to the change of each data value representing the sensitivity of the estimate with respect to that data value.

16. A method according to claim 13, wherein the turbomachine is a turbo compressor for moving gas, the pre-defined fluid properties at the inlet corresponding to a pre-defined value of a gas-constant.

17. A method according to claim 16, wherein the first process quantities are:
   torque directed to the impeller,
   rotational speed of the impeller,
   pressure rise of the gas,
   inlet pressure of the gas, and
   inlet temperature of the gas,
and wherein the reference table contains tabulated values of isentropic efficiency and rotational speed in the reference inlet conditions as functions of mass flow and pressure ratio in the reference inlet conditions, and wherein the second process quantity is the mass flow in the actual operating conditions.

18. A method according to claim 16, wherein the first process quantities are:
   torque directed to the impeller,
   rotational speed of the impeller,
   pressure rise of the gas,
   inlet pressure of the gas, and
   inlet temperature of the gas,
and wherein the reference table contains tabulated values of mass flow and rotational speed in the reference inlet conditions as functions of torque and pressure ratio in the reference inlet conditions, and wherein the second process quantity is the mass flow in the actual operating conditions.

19. A method according to claim 13, wherein the turbomachine is a pump for moving liquid, the pre-defined fluid properties at the inlet corresponding to a predefined a density of the liquid.

20. A method according to claim 13, wherein the rotational speed of the impeller is controlled on the basis of the estimate of the second process quantity.

21. A method according to claim 13, wherein at least one from the following list is controlled on the basis of the estimate of the second process quantity: one or more inlet guide vanes, one or more outlet guide vanes, one or more diffuser guide vanes.

22. A method according to claim 13, wherein start and stop commands are produced for one or more other turbomachines so as to keep the estimate on a desired range.

23. A turbomachine system comprising an inlet (202) and an outlet (203) for fluid to be moved and at least two turbomachines (200, 220, 230) each of which comprises:
   a chamber connected between the inlet and the outlet,
   an impeller placed in the chamber for moving the fluid, and
   equipments for measuring first process quantities related to that turbomachine,
the turbomachine system further comprising a processor (208) arranged to calculate for each of the turbomachines an estimate for a second process quantity related to that turbomachine on the basis of measured values of the first process quantities and a reference table of interrelations between process quantities prevailing in reference inlet conditions which correspond to a pre-defined inlet fluid temperature, a pre-defined inlet fluid pressure, and pre-defined fluid properties at the inlet, characterized in that the reference table and the measured values of the first process quantities represent such a set of data values that the estimate is obtainable on the basis of different sub-sets of the set of data values, and the processor is arranged to give, in the calculation of the estimate, more weight to a first sub-set of the set of data values which has a smaller error estimate than to a second sub-set of the set of data values which has a bigger error estimate in order to increase the accuracy of the estimate, the error estimate related to each sub-set being proportional to a scalar product of a vector of squares of sensitivities of the estimate with respect to the data values of that sub-set and a vector of variances of the data values of that sub-set, and the processor is arranged to start and stop one or more of the turbomachines so as to keep the estimates related to running turbomachines on a desired range.

24. A computer program for obtaining an estimate for a process quantity related to a turbomachine that comprises a chamber having an inlet and an outlet for fluid to be moved, an impeller placed in the chamber for moving the fluid, and equipment for measuring first process quantities related to the turbomachine, the computer program comprising computer executable instructions for controlling a programmable processor to calculate an estimate for a second process quantity related to the turbomachine on the basis of measured values of the first process quantities and a reference table of interrelations between process quantities prevailing in reference inlet conditions which correspond to a pre-defined inlet fluid temperature, a pre-defined inlet fluid pressure, and pre-defined fluid properties at the inlet, characterized in that the reference table and the measured values of the first process quantities represent such a set of data values that the estimate is obtainable on the basis of different sub-sets of the set of data values, and the computer program comprises computer executable instructions for controlling the programmable processor to give, in the calculation of the estimate, more weight to a first subset of the set of data values which has a smaller error estimate than to a second sub-set of the set of data values which has a greater error estimate in order to increase the accuracy of the estimate, the error estimate related to each sub-set being proportional to a scalar product of a vector of squares of sensitivities of the estimate with respect to the data values of that sub-set and a vector of variances of the data values of that sub-set.

25. A computer program according to claim 24, further comprising computer executable instructions for controlling the programmable processor to control the rotational speed of the impeller on the basis of the estimate of the second process quantity.

26. A computer program according to claim 24, further comprising computer executable instructions for controlling the programmable processor to produce start and stop commands for one or more other turbomachines so as to keep the estimate on a desired range.

27. A computer program product comprising a computer readable medium, characterized in that the computer readable medium is encoded with a computer program according to claim 24.

* * * * *